March 22, 1927.

P. A. LAWRENCE 1,621,936

CONSTANT PRESSURE INTERNAL COMBUSTION ENGINE

Filed May 22, 1922   2 Sheets-Sheet 1

Inventor
Paul Andrew Lawrence

March 22, 1927.

P. A. LAWRENCE 1,621,936

CONSTANT PRESSURE INTERNAL COMBUSTION ENGINE.

Filed May 22, 1922    2 Sheets-Sheet 2

Witnesses

Inventor
Paul Andrew Lawrence

Patented Mar. 22, 1927.

1,621,936

UNITED STATES PATENT OFFICE.

PAUL ANDREW LAWRENCE, OF GRAND ISLAND, NEBRASKA.

CONSTANT-PRESSURE INTERNAL-COMBUSTION ENGINE.

Application filed May 22, 1922. Serial No. 562,912.

My invention relates to means of securing a high degree of perfection in the combustion of liquid fuel in a certain type of constant pressure internal combustion engine. My invention also has other objects and features, as explained in these specifications and set forth in the claims.

Among the other objects, are:

Means for improving upon the self-starting features of this engine by making the ignition of the fuel more certain, when the engine is extremely cold;

Means for better regulation of the pump supplying the fuel to the fuel admission valve;

Avoidance of heat losses of the highly heated gases to the metal walls surrounding them;

Prevention of fouling of the insulation of the spark plug.

These improvements apply to a particular kind of engine having an air chamber into which a portion of the highly compressed air near the end of the compression stroke is delivered during the remainder of the compression stroke and which delivered air is permitted to return to the cylinder during the fuel injection period of the power stroke. Under normal operation, this type of engine carries sufficient compression so that the temperature of adiabatic compression is sufficiently high, in connection with an uncooled cylinder head, to ignite the fuel without the use of a spark plug. However, when starting the engine cold, especially at a low rate of speed, these temperatures might not be sufficient for proper ignition of the fuel and, therefore, a spark plug and an ordinary induction coil is employed to ignite the fuel until normal operation is attained.

Further, this type of engine is self-starting under full load by admitting air from an air bottle, in which highly compressed air is stored and which starts the engine by the potential energy of the compressed air, and the expansion of the entering air resulting through the injection of gasoline and ignition by the electric spark.

The essential parts of this engine consist of a piston working within a water cooled cylinder; a cylinder head having a hollow formed within it to constitute an air chamber; an opening in the said air chamber and connected to the cylinder by a port; a valve to close the said opening of the air chamber and facing toward the cylinder, so that air may enter the air chamber but cannot return to the cylinder, unless the valve is raised by some external force.

This engine may be either two or four stroke cycle. If four stroke cycle, an inlet and an exhaust valve is provided in the ordinary manner. If two stroke cycle is used, the exhaust takes place through ports in the cylinder walls in the ordinary manner and an inlet valve may be provided in the cylinder head, as shown in the drawings, and air is delivered into the cylinder for scavenging and charging the cylinder by means of a separate air pump.

In order to make this engine self-starting, an air bottle or storage tank is provided, which is connected by means of a pipe and a quickly opening valve to the air chamber in the cylinder head. The injection of fuel and admission of air from the air chamber takes place simultaneously and always begins just at the moment when the piston has passed its inner dead center and is beginning the power stroke.

The admission period of the air from the air chamber and the injection of the fuel may be varied from 0 to about $3/4$ of the piston stroke. When the engine has been shut down for some time, the compressed air in the air chamber usually leaks out so that, when the engine is to be started again, there is no pressure in the air chamber. If the engine is to be started in this condition, it is turned over until the piston has passed the inner dead center and rests in the early part of its power stroke. If the engine is controlled by governor, the cutoff will be late in the stroke. If controlled by hand, the cutoff must be set in a late position. With the engine in this condition, it is only necessary to open the quickly opening valve between the air chamber and the air bottle to start the engine, in much the same manner as opening the throttle of a steam engine, starts it.

In starting the engine in this manner, fuel is injected into the entering air and is ignited by the spark plug, which results in the combined impulse of the potential energy residing in the compressed air and the expansion of the said air, through its combination with the fuel in the process of combustion.

As the admission period may be made to endure for nearly the full stroke of the piston and as, under these conditions, the amount of air entering the cylinder from the air bottle is very much greater than under normal full load operation, it is necessary that the fuel pump should have sufficient capacity to inject the required amount of fuel to combine with nearly the entire charge of air entering the cylinder. This makes it necessary that the fuel pump possess a large excess capacity, which is only useful during periods of starting the engine.

It should also be observed that the fuel is injected, under all circumstances, into a moving stream of air as the air enters the cylinder from the air chamber, and that combustion proceeds at constant pressure and is not an explosion in any sense of the word. Under normal operation, the air chamber contains compressed air at a pressure equal to the compression pressure at which the engine is operating. This pressure rises slightly during the delivery period of the piston and falls an equal amount during the admission period, when the air is again returning to the cylinder. This cycle takes place during every cycle of the engine and the result is a to and fro movement of the air between the cylinder and the air chamber through the port into which the fuel is injected while the air is returning to the cylinder.

A further feature of this type of engine is that it requires no air compressor to charge the air bottle for starting purposes, for the engine normally compresses and delivers the said air for starting to the air bottle in the regular process of operation.

When the admission period is reduced to zero and no fuel is injected into the cylinder, the air chamber valve is not lifted for a portion of the power stroke of the engine and the engine becomes an air compressor, delivering air to the air chamber but not receiving any therefrom. In this condition, the engine may be made to serve as a brake, in such uses where the torque of the drive shaft may become reserved.

The engine I illustrate in my drawings is a two stroke cycle engine and I show only such parts as are required to illustrate the substance of my invention. The application and use of my invention is fully shown and described in the drawings and specifications. Similar figures, in all of the views of the drawings, refer to the same parts.

Referring to the drawings.

A single cylinder engine is shown and described, but the same mechanism may be used for a multiple cylinder engine by simply using an increased number of fuel injection elements.

Figure 1:
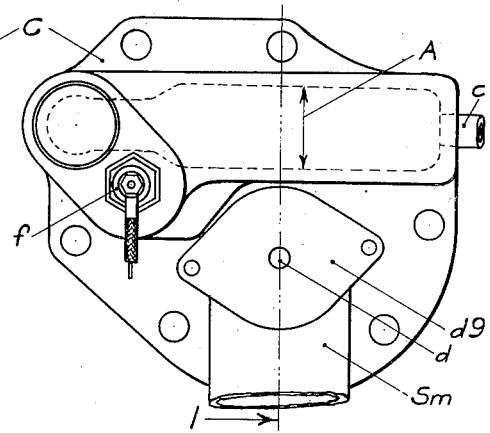
Figure 1 is a top view of the cylinder head.

Referring to Figure 1, "C" is the cylinder head. It consists of a casting with a hollow chamber formed within it, as shown by the dotted lines and marked, "A," constituting an air chamber. The air chamber, "A," has a pipe, "c," tapped into it at one end, which is connected to an air bottle for starting the engine. At the other end of the air chamber is a round opening, opening downward into the combustion port. "$f$" is the spark plug located as close to the outlet of the air chamber as possible. "$Sm$" is a conduit connecting the inlet valve to the air scavenging pump, not shown in the drawings. Air is delivered through this conduit under low pressure to drive out the exhaust gases and to charge the cylinder. "$d$" is the upper end of the inlet valve stem, which is operated by a tappet and rod from a cam on the cam shaft. These parts are not shown in the drawings.

Figure 2:
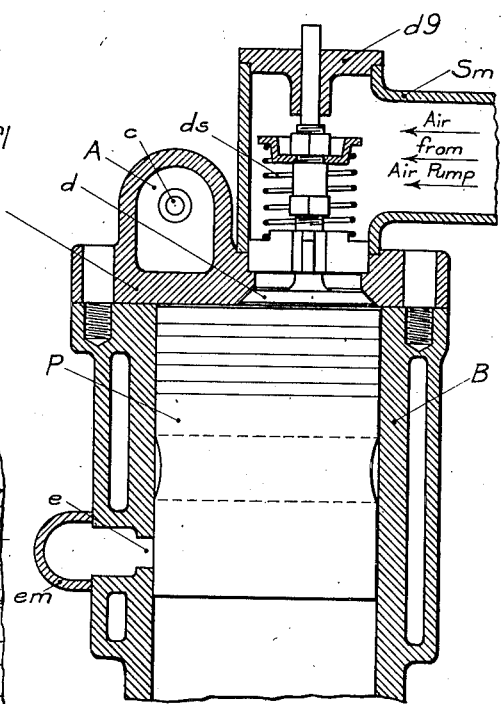
Figure 2 is a vertical section through the engine cylinder and cylinder head, taken upon the plane "1" of Figure 1.

Referring to Figure 2, "A" is the air chamber formed within the cylinder head. "P" is the engine piston. "$d$" is the inlet valve. "$ds$" is the inlet valve spring. "$e$" are the exhaust ports, and "$em$" is the exhaust manifold which conducts the exhaust away from the engine. The cylinder is water jacketed, but the cylinder head is uncooled.

Figure 3:
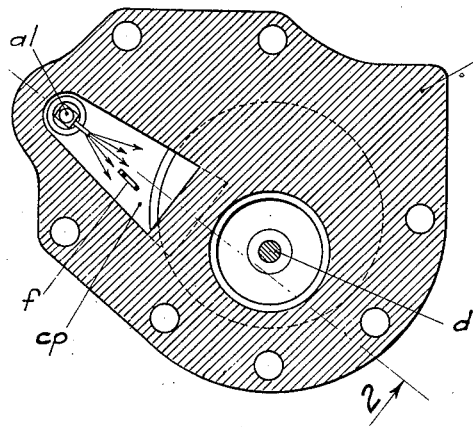
Figure 3 is a horizontal section through the cylinder head, taken upon the section plane "3" of Figure 4, and looking down upon the exposed combustion port.

Referring to Figure 3, which shows a horizontal section through the cylinder head looking down into the combustion port, "$cp$" is the combustion port, "$f$" are the spark points of the spark plug, and "$a^1$" is the fuel nozzle. The arrows, issuing from the fuel nozzle represent the oil spray. The dotted circle shows the outline of the cylinder bore.

Figure 4:
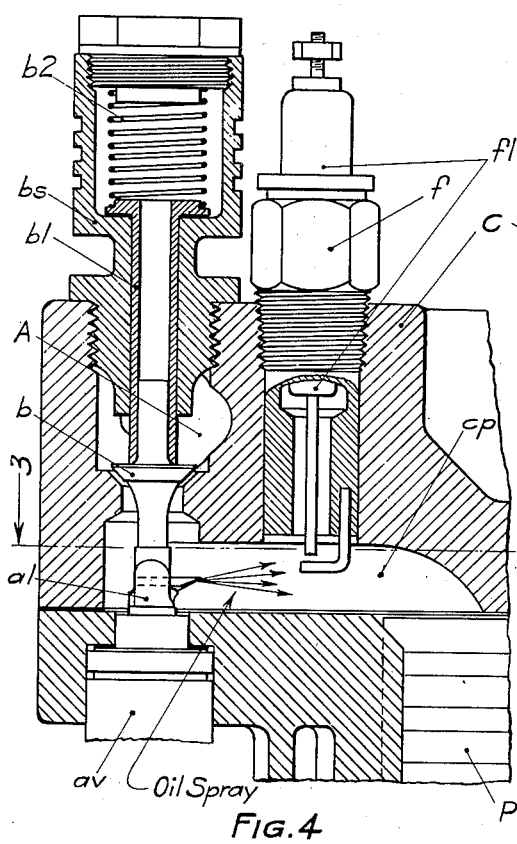
Figure 4 is an enlarged vertical section through a portion of the cylinder head and a portion of the cylinder, taken upon the section plane "2" of Figure 3. It illustrates the injection of the fuel into the combustion port.

Referring to Figure 4, "$f$" is the spark plug; "$cp$" is the combustion port; "$a^1$" is the fuel nozzle; "$b$" is the air chamber valve, closing the opening between the air chamber and the combustion port; "$b^1$" is the plunger which returns the valve, "$b$," to its seat; "$bs$" is the housing for the plunger, "$b^1$," and the spring, "$b^2$," which presses down the plunger; "A" is the air chamber; "$av$" is the admission valve, which injects the fuel and raises the air chamber valve, "$b$;" and "P" is the piston of the engine. The air flows from the air chamber, "A," through the valve, "$b$," into the port, "$cp$," where it is met by the oil issuing from the nozzle, "$a^1$," and is either fired by the spark plug "$f$," or by the self-ignition, after which it passes on through the port into the cylinder and follows the piston as it advances.

Figure 5:
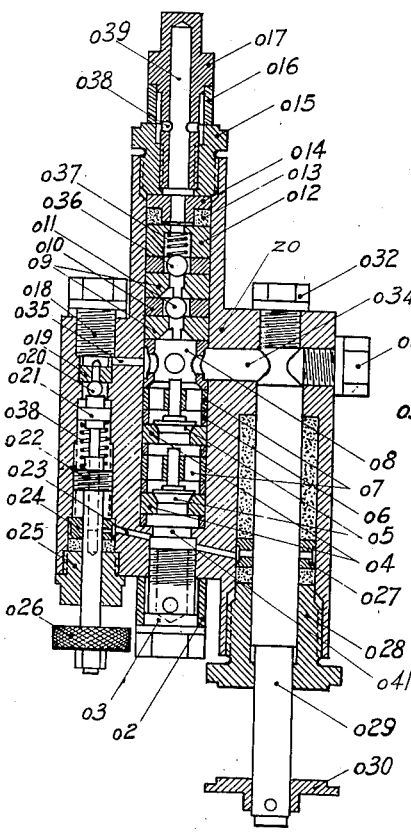
Figure 5 is a sectional view of the fuel pump, which pumps the fuel for injection by the admission valve. The view shows a vertical section upon a plane passing through the center of the plunger, the valves, and the by-pass valve.
Figure 6:
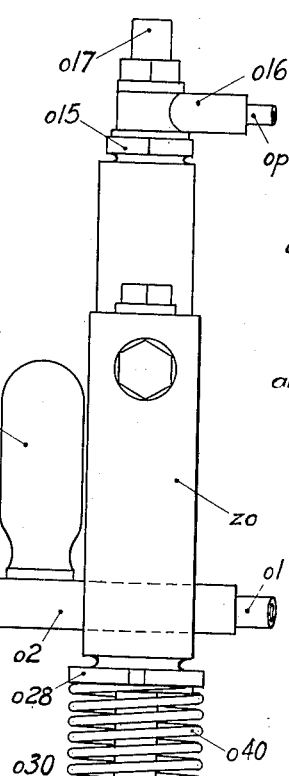
Figure 6 is an external side view of the fuel pump.

Referring to Figures 5 and 6, which show two views of the fuel oil pump, it will be seen that the pump body consists of three circular vertical chambers. The chamber to the right contains the plunger. The central chamber contains the suction and discharge valves, and the chamber to the left contains the by-pass valve; "$o^{29}$" is the pump plunger; "$o^{34}$" is the port communicating between the pump plunger and the valve chamber; and "$o^{35}$" is the port communicating between the valve chamber and the by-pass valve. Both the suction and discharge valves in the valve chamber are in duplicate and all the valves are arranged so that they may be readily removed by unscrewing the nut, "$o^{15}$." The inlet oil connection is shown at the lower end of the valve chamber and is marked, "$o^2$." This connection is held to the pump body by means of the screw, "$o^3$," which is hollow and conducts the oil to the valve chamber. "$o^5$," are the inlet valves, and "$o^4$" are the inlet valve seats. The inlet valves are of aluminum and have stems working in guides, "$o^7$." The lift of these valves is limited and is very small and they are seated by gravity. The guides have openings through which the oil passes upward. "$o^{11}$" and "$o^{36}$" are the discharge valves consisting of steel balls resting on seats, "$o^9$." The discharge valve, "$o^{11}$," is free, but the discharge valve, "$o^{36}$," is pressed down by a light spring. "$o^{14}$" is a washer which bears on the soft packing, "$o^{13}$," and which is held down by the nut, "$o^{15}$." "$o^{15}$" is bored and threaded to receive the hollow screw, "$o^{17}$," which holds the discharge oil connection, "$o^{16}$," in place. "$o^{17}$" is made hollow so as to form a small air chamber. The entire valve set is arranged in the valve chamber, with proper ring spacers. The pressure of the nut, "$o^{15}$," makes all the joints tight. A port, "$o^{23}$," is drilled in the lower portion of the pump body and, thereby, forms a passage between the three chambers. A valve seat, "$o^{19}$," rests upon the shoulder in the body and is held down by the screw, "$o^{18}$." This valve seat forms the seat for a small steel ball valve, "$o^{20}$," which is pressed to its seat against the pressure of the oil in the pump by a plunger, "$o^{21}$," and spring. The plunger, "$o^{21}$," is guided by its stem passing into the hollow of the adjustment screw, "$o^{22}$." By turning the knurled wheel, "$o^{26}$," the screw, "$o^{22}$," tightens or loosens the spring, "$o^{38}$," and adjusts the by-pass pressure. The amount of oil by-passed is very small and readily passes down the chamber and through the lantern ring, "$o^{24}$," and port, "$o^{23}$," into the inlet chamber or pump suction. The stem of "$o^{22}$," is packed by soft packing held in by the gland, "$o^{25}$." "$o^{23}$" is an air chamber on the suction side of the pump, which makes delivery of oil to the pump more certain.

Figure 7:
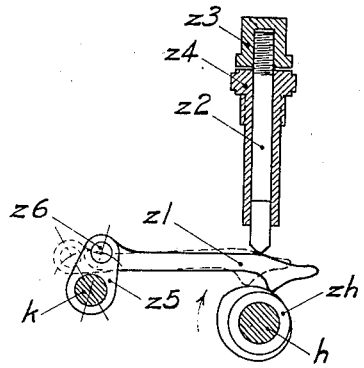
Figure 7 is a side view of the cam and driving mechanism for operating the fuel pump. The view is taken looking parallel to the axis of the cam shaft.

Referring to Figure 7, "$h$" is the cam shaft; "$zh$" is the cam for operating the fuel pump; "$z^1$" is the cam follower, making contact with the cam by a projection on its lower surface and carrying the push rod, "$z^2$," on its upper surface. The contour of the upper surface of the follower is such that, when the follower is shifted horizontally, the timing of the lift of the push rod, "$z^2$," is not changed with relation to the position of the engine piston. "$k$" is the control shaft which carries an arm, "$z^5$," to which the follower, "$z^1$," is hinged. The rocking motion of the control shaft, "$k$," imparts a horizontal movement to the follower, "$z^1$," and, thereby, makes contact at different portions of the cam. The push rod, "$z^2$," is mounted by a cap "$z^3$," which is made adjustable by placing liners between the end of the rod, "$z^2$," and the bottom of the cap. "$z^4$" is the guide for the push rod, "$z^2$," which is screwed into the engine frame.

Figure 8:
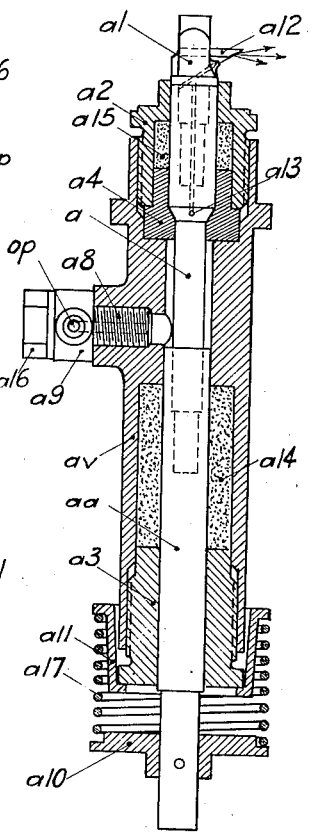
Figure 8 is a vertical section of the admission valve, which injects the fuel and opens the air chamber valve.

Referring to Figure 8, "$op$," is the oil pipe from the fuel pump connecting it to the valve by means of the connection, "$a^9$," and the hollow screw, "$a^{16}$." The oil enters the valve body through this connection and finds its way to the conical valve head of rod, "$a$," which rests upon a seat, "$a^4$." A small hole, "$a^{13}$," is drilled into the face of this conical valve head and communicates with the nozzle, "$a^1$," by means of a small hole running through the center of the member, "$a^1$," to its upper end, where it meets another small hole at an angle to it and which terminates into the fuel nozzle. The rod, "$a$," screws into the lower rod, "$aa$," which is of larger diameter. The rod, "aa," has the same diameter as the upper end of the rod, "a" in order to balance the pressure within the valve body and prevent the pressure from opening the valve. The upper portion of the rod, "a," has a short column of packing, "$a^{15}$," inserted about it to prevent the oil from passing up along the rod, instead of through the small hole in the interior, and out through the valve nozzle. Not much packing is required, as the pressure is not great. The rod, "aa," is packed by an ample quantity of packing, "$a^{14}$," as this portion has to withstand the full pressure of the injection oil. "$a^3$," is a gland threaded into the valve body and holds the packing, "$a^{14}$," in place. "$a^2$" is a hollow member forming the stuffing box for the packing, "$a^{15}$," and is threaded into the valve body and holds the valve seat, "$a^4$," in place. "$a^{10}$" and "$a^{11}$" are spring seats for mounting the spring, "$a^{17}$," which closes the valve. The nozzle, "$a^1$," terminates in a fine round hole, which discharges a solid stream of oil at a great velocity against a deflector, "$a^{12}$." The oil strikes the deflector with such force that it tears it into a fog and gives it the proper direction.

Figure 9:
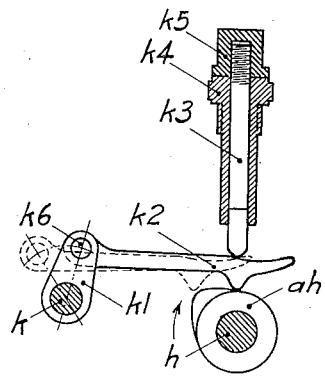
Figure 9 is a side view of the cam and driving mechanism of the admission valve. The view is taken looking parallel to the axis of the cam shaft.

Referring to Figure 9, "$h$" is the cam shaft; "$ah$" is the cam for operating the admission valve shown in Figure 8. The admission valve must always open at the same relative position with the piston or crank shaft, but must close at different portions of the stroke, in accordance with the load on the engine. This is accomplished by means of the device shown. The cam follower, "$k^2$," makes contact with the cam by a projection on its lower surface and carries the push rod, "$k^3$," on its upper surface. This push rod operates the admission valve. The cam follower is hung by a pin, "$k^6$," from the arm, "$k^1$," which is secured to the control shaft, "$k$." The control shaft, "$k$," is rocked to and fro by means of the engine governor or, if hand controlled, by means of a hand lever. This to and fro motion of the control shaft, "$k$," imparts a horizontal motion to the follower and makes contact at different portions of the cam. The upper surface of the follower, "$k^2$," where it comes in contact with the push rod, "$k^3$," is so formed that no matter what the position of the control shaft may be, the timing of the admission valve opening is always the same. The push rod, "$k^3$," has a cap nut, "$k^5$," which comes in contact with the lower end of the rod, "aa," shown in Figure 8. Adjustment is secured by placing liners between the end of the rod, "$k^3$," and the bottom of the threaded hole in the cap, "$k^5$." The guide, "$k^4$," is threaded into the engine frame. The dotted lines show the position of the cam follower, when the cutoff is reduced to zero. The admission valve does not open at all when the follower is in this position and no fuel is injected. The engine then runs as an air compressor.

Figure 10:
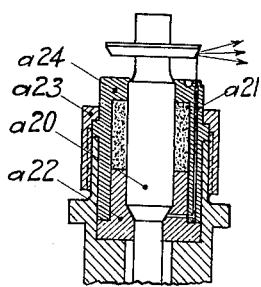
Figure 10 is a modified form of admission valve, in which the fuel injection nozzle is located in the stationary portion of the valve instead of the rod.

Figure 10 shows a modification of the admission valve shown in Figure 8. The upper end only is shown, for the balance of the valve is the same as shown in Figure 8. In this modification the nozzle is not located near the end of the movable member but is placed in one of the stationary members and directs a stream of oil vertically upward. The nozzle likewise consists of a small round hole from which a solid stream of oil issues at high velocity and strikes a deflector formed near the end of the valve rod, "$a^{20}$." This deflector atomizes the oil and gives it proper direction. The valve rod, "$a^{20}$," has a conical head resting upon the valve seat, "$a^{22}$." The valve seat, "$a^{22}$," is pierced by a small hole registering with a small hole, "$a^{21}$," in the member, "$a^{24}$," through which the oil passes upward and out through the nozzle when the valve rod, "$a^{20}$," is lifted. The member, "$a^{24}$," holds the valve seat, "$a^{22}$," in place and is screwed down by the nut, "$a^{23}$," which is threaded to the valve body.

The application of the invention to the type of engine to which it is adapted will be understood by a description of the operation of the engine and its various parts. The air scavenging pump, for charging and scavenging the cylinder, may be of ordinary construction, capable of delivering an ample supply of air, at low pressure, to drive out the exhaust and fill the cylinder with a fresh charge of air.

The mechanical clearance of the engine piston is made as small as is practical without having the piston strike the head. The volumetric clearance is, therefore, extremely small and, if no means were provided for the air to escape elsewhere, the compression pressure would be about 1,000 lbs. Owing to the small piston clearance, the volumetric clearance resides largely within the combustion port. Under normal operation, the air chamber contains compressed air approximately equal to the compression pressure of the engine.

The exhaust having been driven out and the cylinder charged with air, the piston, on its inward stroke, compresses the air until it has reached normal operating compression pressure. At this point, the piston has not finished its inward stroke, since the clearance is smaller than that due to the compression pressure. The completion of the piston stroke is, therefore, attended by a delivery of the compressed air through the air chamber valve, "b," which is free to open, into the air chamber, "A." The quantity of compressed air delivered to the air chamber is approximately one-half of the total quantity of air compressed.

When the piston has reached the upper dead center, the status of the operation is as follows:

A small portion of compressed air lies between the upper part of the piston and cylinder, which amounts to about 20% of the total air compressed. A larger portion of the compressed air lies within the combustion port and represents about 30% of the total air compressed. The balance of the compressed air has been delivered into the air chamber and lies above the air chamber valve, "$b$," Figure 4. At this moment, the cam, "$ah$," of Figure 9, is in position to just begin the upward motion of the push rod, "$k^3$," and, consequently, the opening of the valve, "$av$," and lifting of the air chamber valve, "$b$."

As the crank is traveling through the early portions of its power stroke and before the piston has advanced any appreciable extent, the fuel issuing from the fuel nozzle, "$a^1$," and ignited by the spark plug or by self-ignition, as the case may be, combines with the compressed air lying within the combustion port. The amount of oil so injected is only sufficient for combination with the air within the port. As the piston accelerates in speed and the admission valve opens wider, both the air from the air chamber and the oil from the nozzle accelerates in velocity in proportion to the accelerating speed of the engine piston. In this manner, each consecutive portion of fuel meets a fresh portion of air entering the combustion port through the open valve, "$b$," from the air chamber. The entire combustion process takes place within the combustion port, "$cp$," while a film of much cooler air is in contact with the top of the piston and which is, therefore, more or less protected by the intense heat of combustion.

When the piston has reached some definite portion of the stroke depending upon the load, the nose of the cam follower, "$k^2$," Figure 9, clears the nose of the cam, "$ah$," and allows the push rod, "$k^3$," to descend, thereby closing the fuel admission valve, "$av$," cutting off the fuel injection and, at the same time, permitting the air chamber valve, "$b$," to seat and preventing further inflow of air into the cylinder from the air chamber.

During this process, under normal operation, the same amount of air has returned to the cylinder during the power stroke as was delivered to the air chamber during the compression stroke, and the air chamber now contains the same amount of air and pressure that it had at the beginning of the cycle. The air chamber is of such capacity that the pressure rises about 50 lbs. on receiving the charge of air compressed by the piston, and drops the same amount upon delivering the air back to the cylinder.

It will be seen that the combustion process within the port, "$cp$," resembles the combustion processes of a gasoline torch or a gas stove, in which the air and fuel are thoroughly mixed in the burner and issue as a blue flame, the indications of perfect combustion.

When the piston has reached the end of its power stroke, it uncovers the ports, "$e$," through which the exhaust passes out, which is followed by the opening of the inlet valve, "$d$," and the reception of a fresh charge of air delivered through the conduit, "$Sm$."

The admission valve. "$av$," Figure 8, serves the combined purpose of opening the air chamber valve during the admission period and injecting the fuel. It receives the fuel, under pressure, from the fuel pump, Figures 5 and 6, through the pipe, "$op$." The oil then passes through the connection, "$a^9$," Figure 8, the hollow screw, "$a^{16}$," into the valve body. It passes up around the stem "$a$," which is given enough clearance in the valve seat, "$a^4$," to just pass the oil and no more, so that foreign matter may not be carried under the conical head. When the conical head is lifted out of contact with the seat, "$a^4$," the oil passes into the small hole, "$a^{13}$," drilled into the facing of the conical head. From here it passes up a small hole drilled in the center of the rod, "$a$," and then through a hole drilled in the center of the nozzle member, "$a^1$," which is threaded into the upper end of the rod, "$a$." The shoulder of the nozzle member, "$a^1$," forms an oil tight fit with the rod, "$a$," and compels the oil to issue out of the open nozzle. The nozzle member, "$a^1$," has a deflector, "$a^{12}$," so positioned that the oil, issuing in a solid stream out of the nozzle, strikes the deflector, "$a^{12}$," at the proper angle to atomize the oil and direct it horizontally into the center of the combustion port.

The intention is that the oil should not come in contact with the walls of the port any more than is possible because, although the walls may have a temperature or approximately 800 degrees, this temperature is, nevertheless, too low for properly burning the oil.

The combustion port is formed entirely within the uncooled cylinder head and has a cross sectional area which is large in comparison with the wall surface. Three of the four sides of the combustion port, therefore, possess, a temperature of some 800 degrees Fahrenheit, and the fourth surface, constituting the upper face of the cylinder, has a temperature of about 220 degrees. Under such conditions, the combustion processes are more perfect than where the wall surface is large in comparison with the volume and of low temperature, as is the case with most injection types of engines.

The pump, shown in Figures 5 and 6, is single acting and is operated by the cam, "$zh$," secured to the cam shaft, "$h$," and which, therefore, operates in unison with the admission valve, "$av$."

The pump plunger, "$o^{29}$," Figure 5, is returned by the spring, "$o^{40}$," Figure 6, and is given a variable stroke by means of the mechanism shown in Figure 7. The control shaft, "$k$," is rocked to and fro, in accordance with the load on the engine, and the arm, "$z^5$," is secured to the control shaft, so that the movements of the control shaft serve to advance or recede the cam follower, "$z^1$," thereby changing the stroke of the pump plunger. The timing of the beginning of the stroke of the pump plunger is such that it begins its upward stroke a small angle in advance of the opening of the fuel valve, "$av$." Therefore, the valve, "$av$," is always under full injection pressure at the moment it opens.

As the admission valve is open for both the up and down stroke of the rod, "$aa$," and as the delivery of the pump must endure for nearly the entire period that the admission valve is open, it follows that the cam, "$zh$," must be so formed that the duration of the upward stroke of the pump plunger must be nearly as great as the latest cutoff possible in the engine.

The cam, "$zh$," therefore, is given an advancing surface subtending an angle of about 90 degrees. This advancing surface is so formed as to impart a uniform upward motion of the cam follower. The receding surface of the cam, "$zh$," subtends an angle of about 270 degrees and is so formed as to give an accelerating return motion of the cam follower. It has been found that the difficulty of securing proper pump action at very high speeds consists in getting the oil into the pump in the extremely small time alloted.

It is, therefore, important that the receding surface of the cam has the proper shape, otherwise the capacity efficiency of the pump will be extremely low. If the pump plunger descends too rapidly, a vacuum will form above it, because the oil cannot enter fast enough. When, however, the pump plunger descends, at first slowly and then at an accelerating speed, it is found that the oil will fill the space created by the descending plunger without loss of capacity.

Another reason for giving the receding surface of the cam, "$zh$," an accelerating return contour is as follows:

When the engine is running at a high rate of speed, the admission period is usually much shorter than when running slowly. When the admission period is short, the control shaft, "$k$," is in a position about half way between the two positions shown in solid and dotted lines in Figure 7. In this position, the cam is not in contact with the follower throughout 360 degrees, but only acts upon the cam follower for about 45 degrees of its advancing surface and about 180 degrees of its receding surface. If the receding surface of the cam were not given an accelerating return contour, the descent of the pump plunger would be so rapid, in this position of the control shaft, as to result in a loss of capacity of the pump.

It will be seen that the capacity of the pump is varied in accordance with the load on the engine. This is for the purpose of avoiding undue wear of the working parts of the pump because, if the pump were allowed to run at full capacity at all times, the quantity of oil pumped by it would be so great, in accordance with the demands that it would result in excessive wear of the by-pass valve and the pump plunger.

The action of the pump is as follows:

The oil enters the pump through the pipe, "$o^1$," the connection, "$o^2$," the hollow screw, "$o^3$," into the lower part of the valve chamber, "$o^{41}$." It then passes up through the aluminum suction valves, "$o^5$," and reaches the chamber, "$o^{34}$." Upon the upward stroke of the pump plunger, "$o^{29}$," the suction valves close by gravity and the oil is forced up through the discharge valves, "$o^{11}$," and "$o^{36}$," then through the hollow screw, "$o^{17}$," and the ports, "$o^{38}$," into the discharge connection, "$o^{16}$." From there it passes on to the admission valve through the pipe, "$op$."

As the pump has an excess capacity, some means must be provided to regulate the discharge pressure. This is done by means of a spring loaded by-pass valve. The by-pass chamber is connected to the valve chamber by means of the port, "$o^{35}$." From here, the by-passed oil passes through the valve seat "$o^{19}$," around the steel ball, "$o^{20}$," around the outside of the plunger, "$o^{21}$," through a groove in the adjusting screw, "$o^{22}$," between the stem of "$o^{22}$," and the lantern ring, "$o^{24}$," then through the port, "$o^{23}$," into the lower part of the valve chamber.

The by-pass pressure is adjusted by turning the knurled wheel, "$o^{26}$," which varies the tension of the spring, "$o^{38}$," thereby pressing the steel ball, "$o^{20}$," with more or less pressure against the seat, "$o^{19}$." By reason of the variable throw of the pump plunger in accordance with the load on the engine, the amount of oil by-passed is relatively small.

In order to smooth out any irregularity of action between the pump and admission valve, a small air chamber, "$o^{38}$," is provided within the hollow screw, "$o^{17}$."

In order that any slight leakage of the pump plunger may not result in a waste of oil, a lantern ring, "$o^{27}$," is provided, which is in communication with the lower portion of the valve chamber, "$o^{41}$," and, therefore, is not under pressure. The oil leakage passes to the suction side of the pump and is re-pumped into the discharge pipe.

As the suction demands of the pump are intermittent, the rapid pulsations would set up a vibration in the suction pipe which would seriously interfere with the inlet of the oil. To avoid this and to smooth out these rapid fluctuations of pressure, a vacuum chamber, "$o^{33}$," is provided, which serves as an oil reservoir close to the pump, in accordance with the well known action of air chambers on the suction pipe of pumps in general.

An important requirement in engines of this type, using an air chamber and an air chamber valve, is that the air chamber valve, "$b$," must be perfectly free to open at the slightest increase in pressure in the combustion port over the pressure in the air chamber, "$A$." It is, therefore, evident that the stem of the air chamber valve, "$b$," must not be confined by packing, the friction of which would more or less interfere with its free action.

In order that the valve, "$b$," Figure 4, may not even be confined by the tension of the spring, "$b^2$," the spring plunger, "$b^1$," has a shoulder at its upper end which seats in the spring housing, "$bs$," so that it leaves the air chamber valve free to lift a small amount (about $\frac{1}{32}$ of an inch), before it becomes loaded with the tension of the spring, "$b^2$." This valve is, therefore, free to rise at the slightest increase in pressure in the port, "$cp$," above the pressure of the air in the air chamber. In order to guide the valve, "$b$," it has a stem which extends upward into the hollow of the plunger, "$b^1$."

It will be seen that the spark plug, "$f$," has a long extension of the casing below the porcelain, "$f^1$." The bore of this casing is reduced at its lower end, which helps to avoid fouling of the porcelain, for it is difficult for oil to find its way through this reduction in bore, and to protect the porcelain from the radiant heat of combustion. As the engine compresses pure air, the porcelain will be surrounded by compressed air during the combustion of the oil and no fire can ever reach the porcelain, under these conditions. As the pressure in the engine declines, the compressed air within the bore of the spark plug is discharged into the cylinder, thereby sweeping out any soot which may attempt to creep up into the bore of the spark plug.

The spark plug is located just as close to the fuel nozzle, "$a^1$," as possible. It has been found that, when starting engines of this type cold, ignition of the fuel may be secured at temperatures so low that the vapor tension of the oil would not result in a sufficiently rich mixture to fire. But, if, under these circumstances, the liquid fuel was directly projected against the spark points, the heat of the electric spark is sufficient to fire the oil by heating minute portions and igniting them, after which the flame spreads throughout the mass. If, therefore, the spark plug is too far distant from the fuel nozzle, ignition is not certain at low temperatures.

The spark plug is connected to an ordinary induction coil and a battery of dry cells. A timer may be used to conserve the battery current, but not for the purpose of timing the ignition, as ignition of the fuel should ensue immediately upon its injection.

If a timer is used, it should be timed so that the spark is on slightly before the fuel is injected and should endure for about thirty degrees of crank travel after the fuel injection has begun.

I claim:

1. In an internal combustion engine of the type described the combination of an air chamber valve, a spring housing removed from the heat of the head, a neck in said housing to obstruct the conduction of heat, a spring plunger, and a shoulder on said spring plunger for seating the plunger before the seating of the said air chamber valve.

2. In an internal combustion engine, the combination of a cylinder; a piston moving therein and having a minimum of mechanical clearance between the piston and the cylinder head; an uncooled cylinder head; an air chamber formed within said cylinder head and normally containing compressed air of a pressure equal to the compression pressure of the engine; a combustion port formed within the lower surface of said cylinder head; an opening communicating between the air chamber and the combustion port; a non-return valve closing the opening of said air chamber opening and having a stem extending upward into a guiding member mounted in a housing, said guiding member being held down by a spring; a shoulder on said guiding member seating within the housing before the said air chamber valve has become seated, thereby giving said air chamber valve a slight play free from the tension of said spring.

3. In an internal combustion engine of the type described, the combination of an admission valve having a rod passing through its interior; a combustion port in the cylinder head; a nozzle at the upper end of said admission valve; an oil deflector on said admission valve rod for dividing and directing the fuel spray; and a spark plug in said combustion port in the path of the fuel spray.

4. In an internal combustion engine of the type described, the combination of an uncooled cylinder head; an air chamber formed within said head; a combustion port formed within the lower surface of said cylinder head; an opening between said air chamber and combustion port; a valve to close said air chamber opening; an admission valve to operate said air chamber valve and inject fuel into said combustion port; a fuel pump to supply fuel oil, under pressure, to the admission valve during the injection period; and a spring loaded adjustable by-pass valve in said fuel pump, whereby the pressure of the oil supplied to said admission valve may be adjusted, in accordance with the compression pressure desired to be carried by the engine.

5. In an internal combustion engine, the combination of a cylinder; a piston moving therein; an uncooled cylinder head; an air chamber formed within said head; a combustion port formed within the lower surface of said cylinder head; an opening between said air chamber and combustion port; a valve to close said air chamber opening; means for opening said air chamber valve and injecting fuel into said combustion port for a portion of the power stroke; a spark plug entering said combustion port; an air bottle connected to said air chamber and provided with a hand operated valve; and means for starting said engine by admitting compressed air from said air bottle into the said combustion port through said air chamber, injecting said fuel and igniting same by electric spark.

PAUL ANDREW LAWRENCE.